United States Patent Office 2,978,565
Patented Apr. 4, 1961

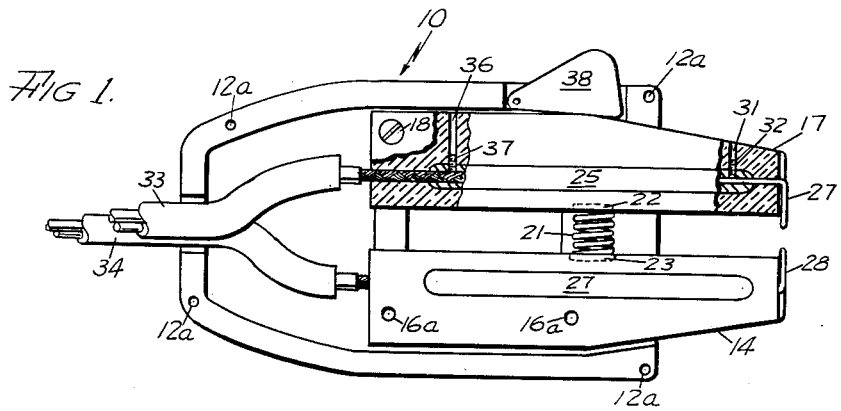
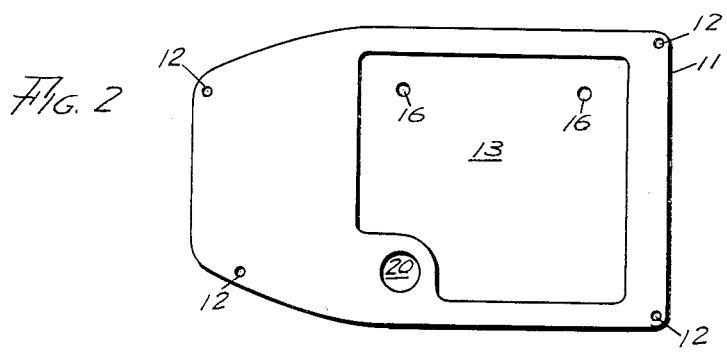
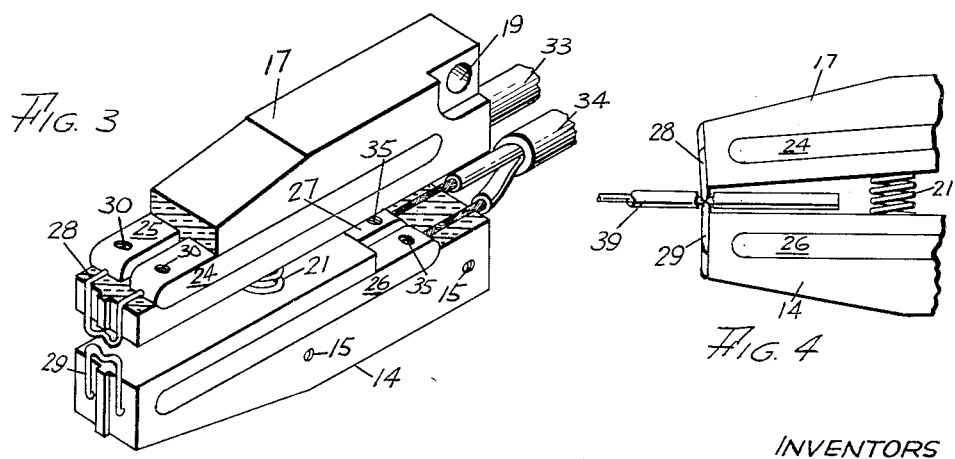
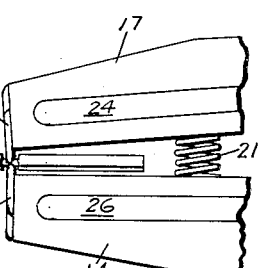
INVENTORS
KENNETH L. SULLIVAN
RAYMOND C. McNAMARA

2,978,565

INSULATED WIRE STRIPPERS

Kenneth L. Sullivan, Arlington, and Raymond C. McNamara, West Newton, Mass., assignors to Raytheon Company, a corporation of Delaware Filed Feb. 12, 1957, Ser. No. 639,773

2 Claims. (Cl. 219—29)

This invention relates to a device for stripping insulation from a wire, and in particular, to a device for stripping insulation without the use of a cutting edge which is prone to damage the bared wire.

The present invention is particularly useful for stripping insulation from wire prior to a soldering operation and wherein it is desirable not to damage the wire by stripping it. Mechanical devices, such as pliers for stripping insulation inevitably result in damage to the wire despite proficient use of the device. This is necessarily so since the operation consists of engaging or holding the insulated wire at a selected point along its length with a cutting edge severing said insulation, and then, while continuing the application of pressure to the wire, scraping the surface of said wire with the cutting edge to remove the insulation therefrom. Often the initial cutting of the insulation at the selected point and the scraping of the wire to remove the insulation therefrom result in damage to said wire. Stranded wire is particularly susceptible to damage by such a stripping operation.

In accordance with the present invention, the insulated wire to be stripped is inserted in a grooved receptacle, at a selected point along its length, of a stationary member of the device. A movable member is then driven manually to have a grooved receptacle carried thereon engage another portion of said wire substantially at the same point along the surface thereof as that contacted by said first member but at a different section thereof. Sufficient pressure is exerted while said wire is in contact with said receptacles to merely engage same, no cutting being performed by said receptacles. Said receptacles are formed of a resistance-type filament connected to a suitable current source for heating the filaments to a suitable temperature to sever or cut the insulation of said wire at said selected point. During normal operation, said filaments are heated prior to insertion of the wire to be stripped so that when the movable member is driven to engage said wire, the heat of said filaments provides the cutting action required to sever said insulation. Said wire may then be withdrawn from said receptacles free of said severed portion without damage to the wire itself or to the insulation remaining thereon.

Since no cutting edge is employed and the application of sufficient heat to sever the insulation is continued over a very short period, the bared wire is free of nicks and cuts and the remaining insulation is not damaged by the application of said heat.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Fig. 1 is a plan view of a case of the device with its cover removed showing components mounted therein;

Fig. 2 is a plan view of the interior of the cover;

Fig. 3 is a perspective view of the components mounted in the case; and

Fig. 4 is a side view of a portion of the components shown in Fig. 3.

Referring now to Figs. 1 and 2, there is shown a case 10 and a cover 11 therefor in which the components of the device are housed. The case and the cover may be fabricated from a thermosetting resin, such as an epoxy, and may contain as an ingredient thereof, chopped fibre glass for durability. Other substances may be readily substituted for fabricating said case and said cover, it being desirable and preferable to have a rigid structure with reasonable heat-resistant properties. The size and shape of said case and said cover may conform to any styling suitable for a hand-operated device. Said cover 11 has a plurality of openings 12 in the surface thereof which mate with a plurality of tapped openings 12a in the case 10 for securing said cover to said case by means of screws (not shown). Said cover 11 may be made from the same material as said case and may be formed with an area 13 shaped to fit over components mounted in said case. A first member 14 is fixed in place in said case in any suitable manner. By way of example, openings (not shown) may be made in said case to correspond with tapped opening 15, shown in Fig. 3, in the first member 14, for securing said member to said case by screws (not shown). Opening 16 in said cover may be made to correspond with tapped openings 16a in said first member 14 for securing said cover to said member by means of screws (not shown). A second member 17 is movably mounted in said case by a screw 18 secured to said case through an opening 19 (Fig. 3) in one portion of said member. An opening 20 in said cover may be aligned with the screw 18 to enable the screw to be tightened for proper movement of said second member. Said members 14 and 17 are normally held apart by a compression spring 21 positioned therebetween and resting in grooved areas 22 and 23 provided for this purpose. Said members may be fabricated from a heat-resistant and electrically non-conductive substance, such as a mica-bearing substance or ceramic. Other substances for this purpose will readily suggest themselves to persons familiar with the fabrication of such devices to perform the functions to be described.

As shown best in Figs. 1 and 3, each of said members 14 and 17 have secured therein a pair of conductors 24 and 25, and 26 and 27. Each of the conductors is separated from the other by the insulating effect of said members. Obviously, said conductors may be separated from each other by an insulating barrier if the material chosen for fabricating said members is preferably selected to be an electrically conductive substance. Said conductors may be made of brass and machined in the same manner since they perform identical functions. Said conductors are preferably of reasonably large cross-section to withstand high current and the heat generated as is explained subsequently. At one end thereof each conductor is machined to provide an opening for the insertion of a resistance-type filament wire 28 and 29 between each pair of conductors. In one embodiment of the device, number 18 Chromel wire has been found to be suitable for this purpose. Additionally, tapped openings 30 are provided in said conductors and corresponding openings 31 are provided in said members for securing said filaments 28 and 29 in said conductors with screws 32.

Openings are also machined in the other end of each of said conductors to accept the terminals of two-wire leads 33 and 34 therein, which wire leads are connected to a suitable source (not shown) for energizing said filaments to develop heat therein. The conductors are provided with suitable tapped openings 35 and corresponding openings 36 are provided in said members for securing the individual wires comprising the leads 33 and 34 in said conductors with screws 37, as is best shown by referring to Figs. 1 and 3. Said filaments are grooved, as shown in Fig. 3, to function as a receptacle for a section along the length of an insulated wire at which section it is desirable to strip the insulation from said wire. A pivoted arm 38 is secured at one end thereof to the case in a manner to have it drive the member 17 toward the member 14 against the force exerted by the spring 21 when depressed manually. Said arm 38 may be fabricated from a fibre material. An insulated wire 39 may be engaged in the receptacles of said two filaments by depressing the arm 38 to have this occur, as shown in Fig. 4. While in the engaged position, the insulation may be severed at the point of engagement by the heat from said filaments. One explanation of the ease with which said severed portion may be removed from said wire by withdrawing same from said receptacles is that the heat imparted to said wire assists in easing the adherence of said insulation from said wire. Said Chromel wire, previously mentioned as being used in the device, is capable of developing temperatures ranging to approximately 800° C. with a suitable current source connected thereto, and thus, the device is suitable for stripping the higher-melting insulation fabricated from the florinated hydrocarbon components, as well as from the lower-melting insulations currently employed.

The device may be contoured to any desired shape in order to stimulate consumer response thereto without departing from the principles described herein. In this regard, the case and cover may be fashioned to resemble a gun and the arm 38 may resemble the trigger therefor.

In summation, there has been described a novel device for stripping insulation from a wire at a selected section along its length in a manner that does not damage the wire or the insulation remaining thereon. In addition, the stripping operation is accomplished rapidly and is suitable for assembly line application.

The invention is not limited to the particular details of construction and materials, as many equivalents will suggest themselves to those skilled in the art. It is accordingly desired that the appended claims be given a broad interpretation commensurate with the scope of the invention within the art.

What is claimed is:
1. A thermal wire stripper comprising, in combination, a pair of jaw members, an enclosing means having at least two hand-grip wall members extending adjacent to and partially enclosing said jaw members, high resistance wires attached at one end of each of said jaw members, the other ends of said jaw members being supported within said enclosure so that said high resistance wires are moveable toward and away from each other, said jaw members including low resistance conductors connected to said high resistance wires, wire conductors connected to said low resistance conductors and to a source of current, said high resistance wires being shaped to grip the insulation of an insulated wire inserted therebetween at a preselected region, the insulation of said insulated wire being heated by the flow of current from said source whereby a preselected portion of said insulation is moveable as said insulated wire is withdrawn from between said high resistance wires.

2. A thermal wire stripper comprising, in combination, a pair of jaw members, an enclosure having hand-grip wall members extending adjacent to and partially enclosing said jaw members, high resistance wires attached at one end of each of said jaw members, the other ends of said jaw members being supported within said enclosure so that said high resistance wires are moveable toward and away from each other, a portion of said hand-grip members being moveable into contact with at least one of said jaw members to move said jaw members toward and away from each other, said jaw members including low resistance conductors connected to said high resistance wires, wire conductors connected to said low resistance conductors and to a source of current, said high resistance wires being shaped to grip the insulation of an insulated wire inserted therebetween at a preselected region, the insulation of said insulated wire being heated by the flow of current from said source whereby a preselected portion of said insulation is moveable as said insulated wire is withdrawn from between said high resistance wires.

References Cited in the file of this patent
UNITED STATES PATENTS

| 1,526,063 | Griffin et al. | Feb. 10, 1925 |
| 1,595,799 | Massingham | Aug. 10, 1926 |
| 1,734,745 | Ray | Nov. 5, 1929 |
| 2,192,056 | Watts | Feb. 27, 1940 |
| 2,465,722 | Hamilton | Mar. 29, 1949 |
| 2,768,276 | Arntzen | Oct. 23, 1956 |

FOREIGN PATENTS

| 144,966 | Switzerland | Apr. 16, 1931 |
| 300,162 | Switzerland | Mar. 1, 1955 |
| 581,618 | Great Britain | Oct. 18, 1946 |
| 593,936 | Great Britain | Oct. 29, 1947 |
| 680,650 | Great Britain | Oct. 8, 1952 |